United States Patent
Morris et al.

(10) Patent No.: US 7,229,218 B2
(45) Date of Patent: Jun. 12, 2007

(54) APPARATUS AND METHOD OF PROVIDING AN OPTICAL CONNECTION BETWEEN PC BOARDS FOR OPTICAL COMMUNICATION

(75) Inventors: Terrel L. Morris, Garland, TX (US); David Martin Fenwick, Chelmsford, MA (US); Richard John Luebs, Windsor, CO (US); Duane A. Wegher, Ft. Collins, CO (US); Jeffry D. Yetter, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 10/945,007

(22) Filed: Sep. 20, 2004

(65) Prior Publication Data

US 2006/0062528 A1   Mar. 23, 2006

(51) Int. Cl.
*G02B 6/36* (2006.01)
(52) U.S. Cl. ............................ 385/89; 385/90; 385/134
(58) Field of Classification Search .................. 385/90, 385/89, 134
See application file for complete search history.

(56) References Cited

U.S. PATENT DOCUMENTS

| | | | |
|---|---|---|---|
| 4,545,074 A | 10/1985 | Balliet et al. | |
| 4,568,931 A | 2/1986 | Biolley et al. | |
| 5,023,863 A | 6/1991 | Masuda | |
| 5,123,073 A | 6/1992 | Pimpinella | |
| 5,218,654 A | 6/1993 | Sauter | |
| 5,245,680 A | 9/1993 | Sauter | |
| 5,420,954 A | 5/1995 | Swirhun et al. | |

(Continued)

FOREIGN PATENT DOCUMENTS

EP   0 311 772   4/1989

(Continued)

OTHER PUBLICATIONS

B. Robertson, et al., "Design and Operation of an in situ Microchannel Alighment-Detection System", Applied Optics, vol. 37, No. 23, Aug. 10, 1998, p. 5368-5376.

(Continued)

*Primary Examiner*—Frank G. Font
*Assistant Examiner*—James P. Hughes

(57) ABSTRACT

Apparatus for connecting an interconnecting cable between first and second printed circuit (PC) boards comprises: a base member disposed on a side of the first PC board for fixedly attaching one end of the interconnecting cable to the first PC board; a first connector attached to the other end of the interconnecting cable; a second connector disposed on a side of the second PC board; and a spring member attached to the base member for supporting the first connector away from the side of the first PC board, the spring member operative to force the first connector against the side of the second PC board to cause slidable engagement of the first and second connectors when one of the first and second PC boards is slid past the other of the first and second PC boards. Apparatus and method of providing optical connection between a first optical array electrically coupled to a first printed circuit (PC) board and a second optical array electrically coupled to a second PC board for providing optical communication between the first and second optical arrays are also disclosed.

30 Claims, 5 Drawing Sheets

U.S. PATENT DOCUMENTS

| | | | |
|---|---|---|---|
| 5,430,442 | A | 7/1995 | Kaiser et al. |
| 5,465,379 | A | 11/1995 | Li et al. |
| 5,477,363 | A | 12/1995 | Matsuda |
| 5,497,465 | A | 3/1996 | Chin et al. |
| 5,515,195 | A | 5/1996 | McAdams |
| 5,600,748 | A | 2/1997 | Kosaka |
| 5,631,988 | A | 5/1997 | Swirhun et al. |
| 5,764,834 | A | 6/1998 | Hultermans |
| 5,920,664 | A | 7/1999 | Hirabayashi et al. |
| 6,185,648 | B1 | 2/2001 | Munoz-Bustamante |
| 6,334,784 | B1 * | 1/2002 | Howard .............. 439/260 |
| 6,363,182 | B2 | 3/2002 | Mills et al. |
| 6,379,053 | B1 | 4/2002 | van Doorn |
| 6,430,335 | B1 | 8/2002 | Carberry et al. |
| 6,509,992 | B1 | 1/2003 | Goodwill |
| 6,527,456 | B1 | 3/2003 | Trezza |
| 6,580,865 | B1 * | 6/2003 | Doorn .............. 385/134 |
| 6,583,445 | B1 | 6/2003 | Reedy et al. |
| 6,583,904 | B1 | 6/2003 | Mahlab et al. |
| 6,587,605 | B2 | 7/2003 | Paniccia et al. |
| 6,588,943 | B1 | 7/2003 | Howard |
| 6,603,899 | B1 | 8/2003 | Popp et al. |
| 6,628,860 | B1 * | 9/2003 | Van Doorn .............. 385/31 |
| 6,634,812 | B2 | 10/2003 | Ozeki et al. |
| 6,651,139 | B1 | 11/2003 | Ozeki et al. |
| 6,661,940 | B2 | 12/2003 | Kim |
| 6,674,971 | B1 | 1/2004 | Boggess et al. |
| 6,804,124 | B2 * | 10/2004 | Takahashi ............. 361/798 |
| 2002/0149825 | A1 | 10/2002 | Levy et al. |
| 2002/0178319 | A1 | 11/2002 | Sanchez-Olea |
| 2003/0081281 | A1 | 5/2003 | DeCusatis et al. |

FOREIGN PATENT DOCUMENTS

| | | |
|---|---|---|
| EP | 0 351 729 | 1/1990 |
| EP | 0 367 460 | 5/1990 |
| EP | 0 811 862 | 12/1997 |
| EP | 0 868 049 | 9/1998 |
| EP | 1 180 912 | 2/2002 |

OTHER PUBLICATIONS

B. Robertson, "Design of an Optical Interconnect for Photonic Backplane Applications", Applied Optics, vol. 37, No. 14, May 10, 1998, p. 2974-2984.

M. Jonsson, et al. "Optical Interconnection Technology in Switches, Routers and Optical Cross Connects", Ericsson Report, p. 1-43.

R. Sims, "Scaling Laws for MEMS Mirror-Rotation Optical Cross Connect Switches", Journal of Lightwave Technology, vol. 20, No. 7, Jul. 2002, p. 1084-1094.

F. Tooley, "Challenges in Optically Interconnecting Electronics", IEEE Journal of Selected Topics in Quantum Electronics, vol. 2, No. 1, Apr. 1996, p. 3-13.

* cited by examiner

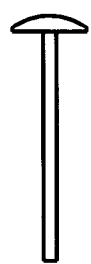
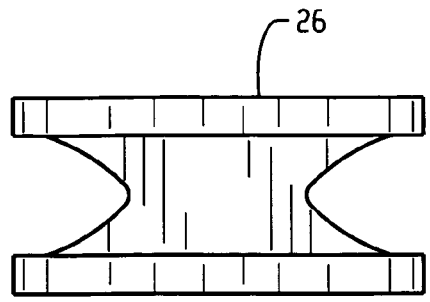
Fig. 2    Fig. 3
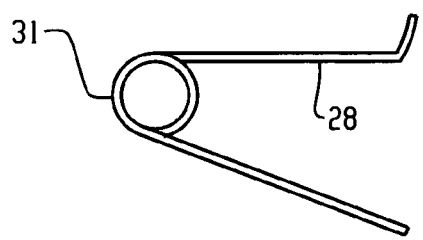
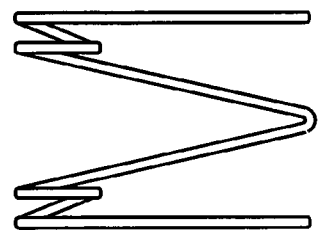
Fig. 4A    Fig. 4B
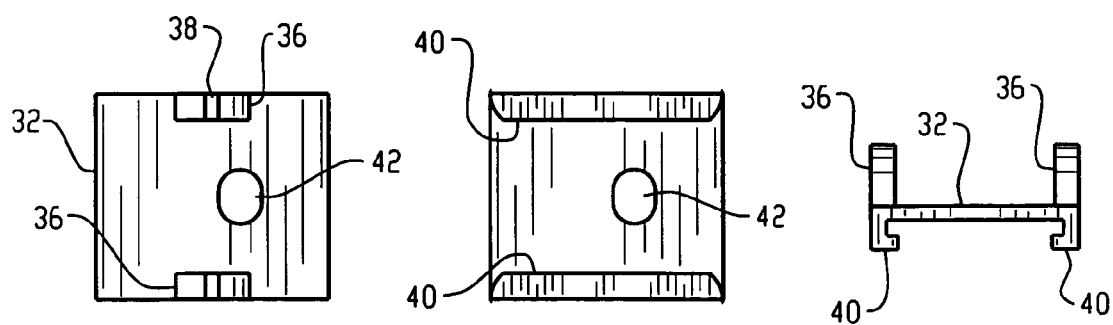
Fig. 5A    Fig. 5B    Fig. 5C

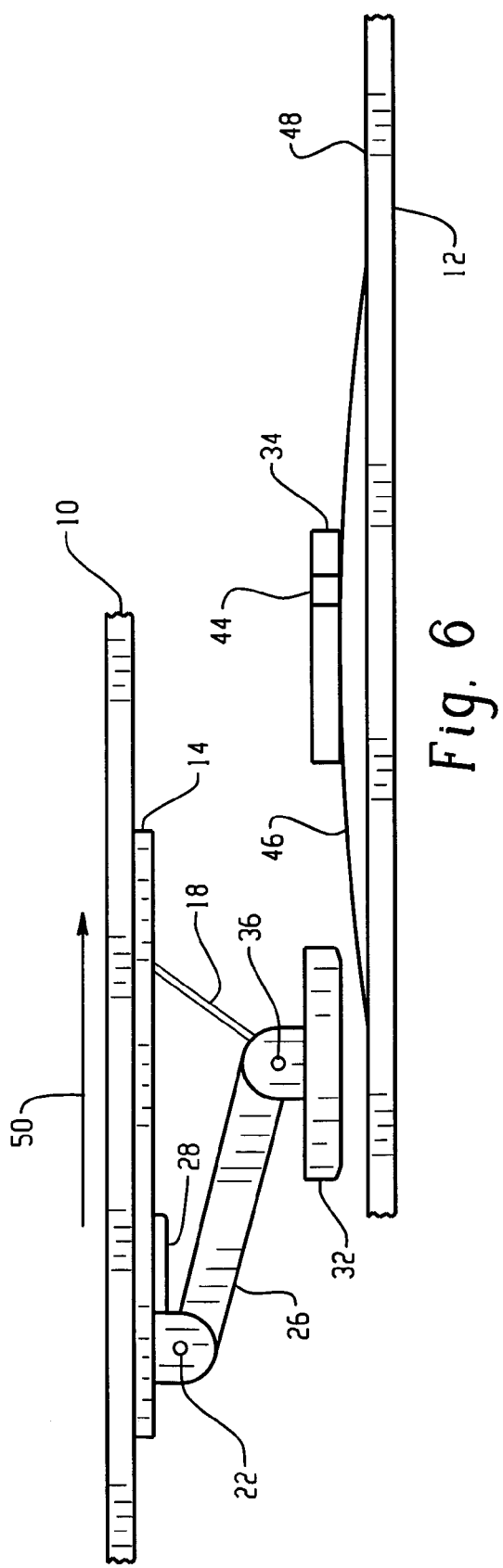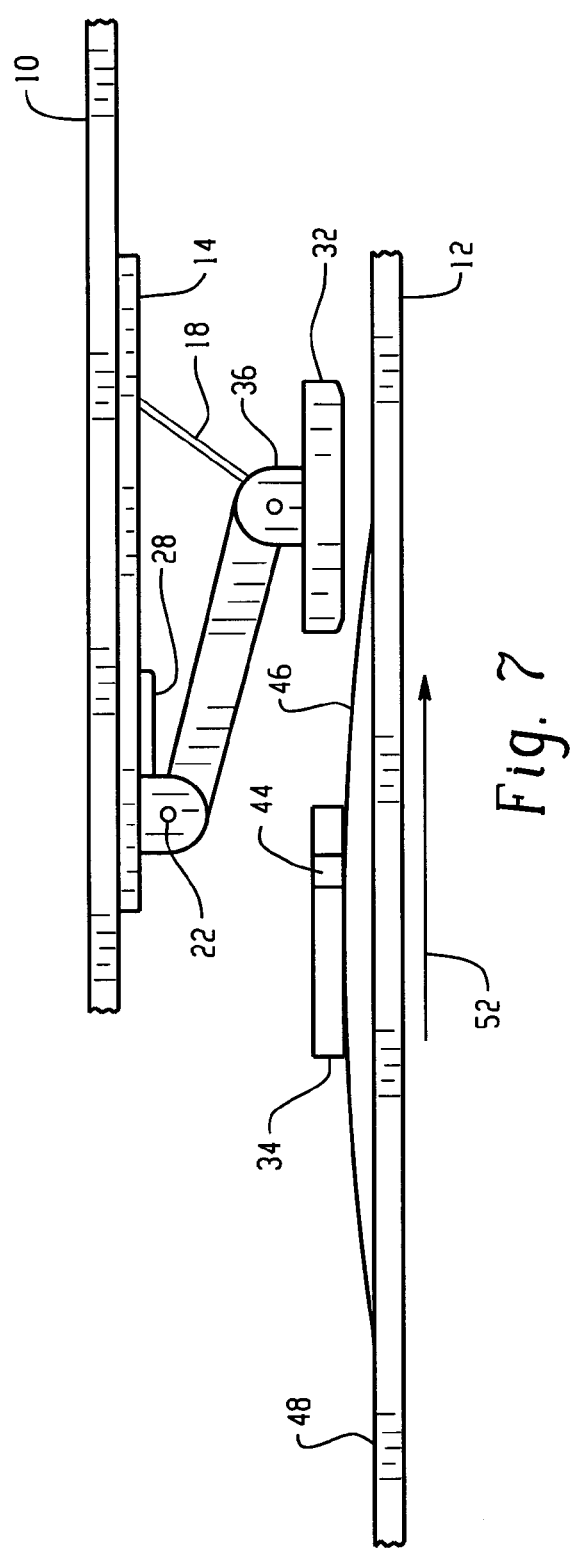

APPARATUS AND METHOD OF PROVIDING AN OPTICAL CONNECTION BETWEEN PC BOARDS FOR OPTICAL COMMUNICATION

BACKGROUND OF THE INVENTION

The present invention relates to optical communications, in general, and more particularly to apparatus and method of providing an optical connection between printed circuit (PC) boards for optical communication there-between.

Greater demands for increased bandwidth are being made on data communication between electrical data processing units or subunits, like printed circuit (PC) boards, for example. Communication rates of tens of gigabits per second are exemplary of such demands. These demands can not be met by traditional metal electrical connections, like those found on mother boards and back plane connections, for example. One solution to meet these demands is to create optical communication channels for board-to-board communication using light coupling between an array of light emitters of one PC board and an array of light detectors of another PC board.

A drawback to this solution is that a mechanical light coupling interconnection between parallel PC boards is no simple task. Thus, a simple and automatic interconnection of the light coupling between PC boards is desirable to render optical communication between PC boards a commercially viable reality. The present invention intends to satisfy this desire through suitable interconnection apparatus.

SUMMARY

In accordance with one aspect of the present invention, apparatus for connecting an interconnecting cable between first and second printed circuit (PC) boards comprises: a base member disposed on a side of the first PC board for fixedly attaching one end of the interconnecting cable to the first PC board; a first connector attached to the other end of the interconnecting cable; a second connector disposed on a side of the second PC board; and a spring member attached to the base member for supporting the first connector away from the side of the first PC board, the spring member operative to force the first connector against the side of the second PC board to cause slidable engagement of the first and second connectors when one of the first and second PC boards is slid past the other of the first and second PC boards.

BRIEF DESCRIPTION OF THE DRAWINGS

FIG. 2 is an illustration of a pivot pin suitable for use in the embodiment of FIG. 1.

FIG. 3 is a top view illustration of an exemplary arm suitable for use in the embodiment of FIG. 1.

FIGS. 4A and 4B are side and top view illustrations, respectively, of a spring mechanism suitable for use in the embodiment of FIG. 1.

FIGS. 5A, 5B and 5C are top, bottom and end view illustrations, respectively, of a fiber connector suitable for use in the embodiment of FIG. 1.

FIG. 6 is a side view illustration showing one mode of operation of the embodiment of FIG. 1.

FIG. 7 is a side view illustration showing another mode of operation of the embodiment of FIG. 1.

DETAILED DESCRIPTION OF THE INVENTION

Figure 1:
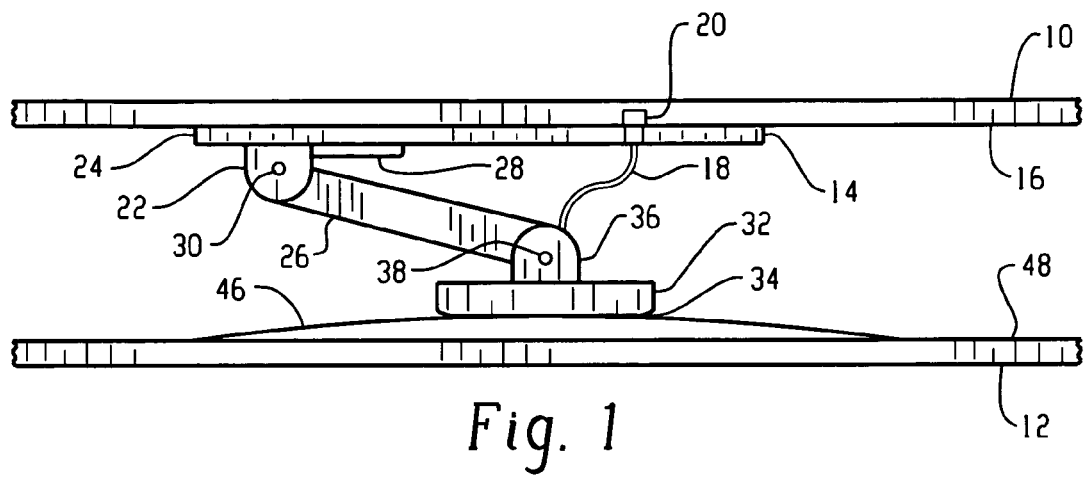
FIG. 1 is a side view illustration of optical fiber interconnection apparatus suitable for embodying the principles of the present invention.

FIG. 1 is a side view illustration of optical fiber cable interconnection apparatus suitable for embodying the principles of the present invention. In the present embodiment, two PC boards 10 and 12 of a data processing system, for example, are disposed in a parallel side-by-side configuration. The PC boards 10 and 12 of the present embodiment may be fixed in place in the parallel configuration through board connectors of a backplane or a motherboard (not shown). Apparatus is provided to support optical communication between an array of light emitters on one board and an array of light detectors on the other board through a cable of optical fibers. This apparatus permits an automatic mechanical interconnect of the cable of optical fibers between PC boards 10 and 12 as one board is slid into its connector with the other board fixed in place as will become more evident from the following description.

Referring to FIG. 1, a platform or base 14 which may be molded plastic, for example, is fixedly disposed over a side 16 of PC board 10. One end of a cable of optical fibers 18 is aligned in cross-section with an array of emitters or detectors 20 disposed on side 16 of board 10. The end of cable 18 is held in alignment with and in proximity to the array 20 by the base 14 as shown by way of example in the cross-sectional sketch of FIG. 1A. The base 14 includes a pivot structure 22 at a distance from the cable 18, preferably close to an end 24. Pivotally coupled to the pivot structure 22 is one end of an arm 26 which is forced away from the base 14 by a spring mechanism 28 attached to both the base 14 and arm 26. A suitable spring mechanism 28 for the present embodiment is shown in the side and top view sketches of FIGS. 4A and 4B, respectively.

The arm 26 which is exemplified in structure by the top view sketch of FIG. 3 may be stamped metal or molded plastic, for example. In the present embodiment, a pivot pin, which may be either plastic or metal, is disposed through an aperture 30 in the pivot structure 22 and through co-aligned apertures at the one end of the arm 26 to provide the pivotal coupling therebetween. An example of a pivot pin for use in the present embodiment is shown in FIG. 2. In the present embodiment, the pivot pin may be also inserted through a loop 31 in the spring mechanism 28 to provide a fulcrum for the spring 28 as well as retain the spring 28 in position. Once inserted though the corresponding apertures of the pivot structure 22 and arm 26, and the loop 31 of spring mechanism 28, the plain end of the pivot pin may be headed to retain it in place.

The other end of arm 26 is pivotally coupled to a connector 32 including a female interconnecting structure which is slidably engagable with a male interconnecting structure of a connector 34 which is shown in greater detail in the side view sketches of FIGS. 6 and 7. A suitable female connector 32 for use in the embodiment of FIG. 1 is shown in top, bottom and end views in FIGS. 5A, 5B and 5C, respectively. Referring to FIGS. 5A–5C, the female connector 32 includes pivot structures 36 at opposite sides of the top thereof. Each pivot structure 36 includes an aperture 38. Apertures at other end of the arm 26 are co-aligned with the apertures 38 of the pivot structure 36 and another pivot pin may be inserted through the corresponding apertures of the connector 32 and arm 26 to render the pivotal coupling in the present embodiment. This pivot pin may be headed after insertion to hold it in place.

Also, at opposite sides of the bottom of the female connector 32 are wrap-around winged female interconnecting structures 40 which accommodate the slidable engagement and mating with the male interconnecting structure of connector 34 as shown in FIG. 1. In addition, the female connector 32 includes an aperture 42 through the body thereof which is aligned over an array of emitters or detectors 44 in the male connector 34 in the mated state. The other end of the cable of optical fibers 18 may be attached to the aperture 42 so that when the female connector 32 is mated with the male connector 34 as shown in FIG. 1, the other end of the cable 18 will be aligned in cross-section over the array 44 as shown by way of example in the cross-sectional sketch of FIG. 1B. In the present embodiment, a ramp like structure 46 is disposed on a side 48 of board 12 and the male connector 34 containing the array 44 is fixedly disposed in the vicinity of the peak of ramp structure 46. The ramp structure 46 may be stamped metal or molded plastic, for example. Wiring 49 from the array 44 may pass through the connector 34 and ramp section 46 to circuitry on the PC board 12.

Moreover, the length of the cable 18 may be made greater then the distance between boards 10 and 12 so that when connectors 32 and 34 are mated, the cable 18 will flex and bend slightly. Structural features of the combination of components including the base 14, arm 26, the pivot structures 22 and 36 and the female connector 32 serve to limit the possible rotation of the arm/connector assembly and maintain the female connector 32 within a few degrees of parallel to the board 10. Thus, in the fully extended position, very little, if any, force is exerted on the cable 18. In the present embodiment, the extended position of the arm/connector assembly is controlled in order to provide accurate initial engagement of the connector 32 with the ramp 46 without stubbing into the leading edge of the other board 12 as will become more evident from the following description. Accordingly, the length of cable 18 may be made commensurate with a desired distance that the arm 26 is permitted to rotate or move when unmated.

Figure 1A:
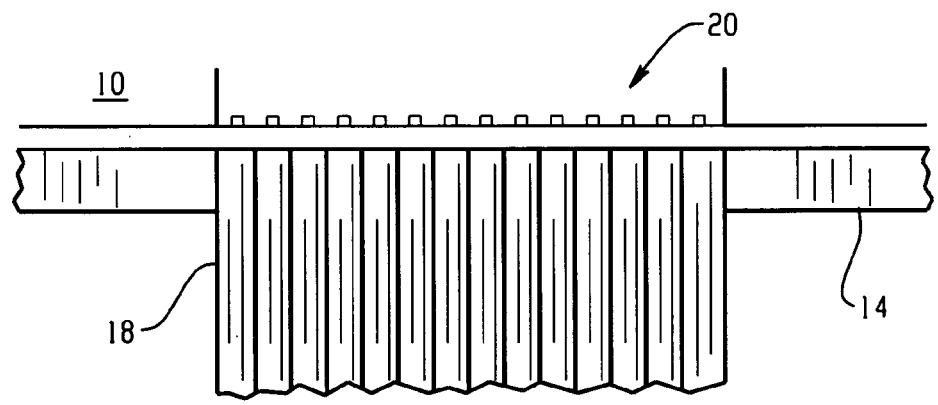
FIG. 1A is a cross-sectional sketch illustrating an exemplary optical interface at one end of an optical fiber cable suitable for use in an embodiment of the present invention.
Figure 1B:
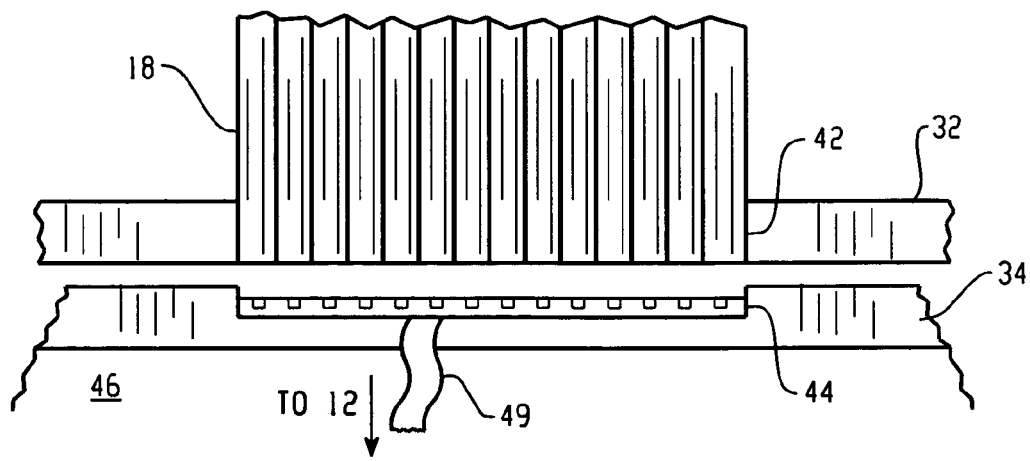
FIG. 1B is a cross-sectional sketch illustrating an exemplary optical interface at the other end of the optical fiber cable suitable for use in an embodiment of the present invention.

FIG. 6 is a side view illustration of the present embodiment showing a slidable engagement of the female connector 32 of board 10 with the male connector 34 of board 12. In the illustration of FIG. 6, board 12 is connected in place and board 10 is being moved in the direction of arrow 50 in parallel with board 12 for connection. In this state, due to the controlled extension of the arm/connector assembly as described above, female connector 32 makes initial contact with side 48 of board 10 and then, traverses up the ramp structure 46. The spring mechanism 28 maintains a force on arm 26 to keep the connector 32 pressed against the surface of ramp 46. Eventually, the female connector 32 will slidably engage the male connector 34 in the vicinity of the peak of the ramp 46 and will be fully engaged with the connector 34 when the board 10 is connected in place as shown by the illustration of FIG. 1. Note that when board 10 is connected and the connectors 32 and 34 are fully engaged, the cross-section of the other end of cable 18 will be aligned with the array 44 as shown in FIG. 1B. Note that board 10 may be withdrawn from its connection and the connectors 32 and 34 disengaged in a reverse process to that of the foregoing.

FIG. 7 is a side view illustration of the present embodiment showing a slidable engagement of the female connector 32 of board 10 which is connected in place with the male connector 34 of board 12 which is being moved in the direction of arrow 52 in parallel with board 10 for connection. In this state, due to the controlled extension of the arm/connector assembly as described above, female connector 32 makes initial contact with side 48 of board 12 and then, traverses up the ramp structure 46. The spring mechanism 28 maintains a force on arm 26 to keep the connector 32 pressed against the surface of ramp 46 from the opposite side. Eventually, the female connector 32 will slidably engage the male connector 34 in the vicinity of the peak of the ramp 46 and will be fully engaged with the connector 34 when the board 12 is connected in place as shown by the illustration of FIG. 1. Note that when board 12 is connected and the connectors 32 and 34 are fully engaged, the cross-section of the other end of cable 18 will be aligned with the array 44 as shown in FIG. 1B. Note that board 12 may be withdrawn from its connection and the connectors 32 and 34 disengaged in a reverse process to that of the foregoing.

While the foregoing described embodiment uses a female interconnection structure for connector 32 and a male interconnection structure for connector 34, it is understood that connector 32 may include a male interconnection structure and connector 34 a female interconnection structure to afford the same slidable engagement therebetween without deviating from the broad principles of the present invention. Alternatively, the interconnection structures for connectors 32 and 34 may be hermaphroditic.

Figure 8:
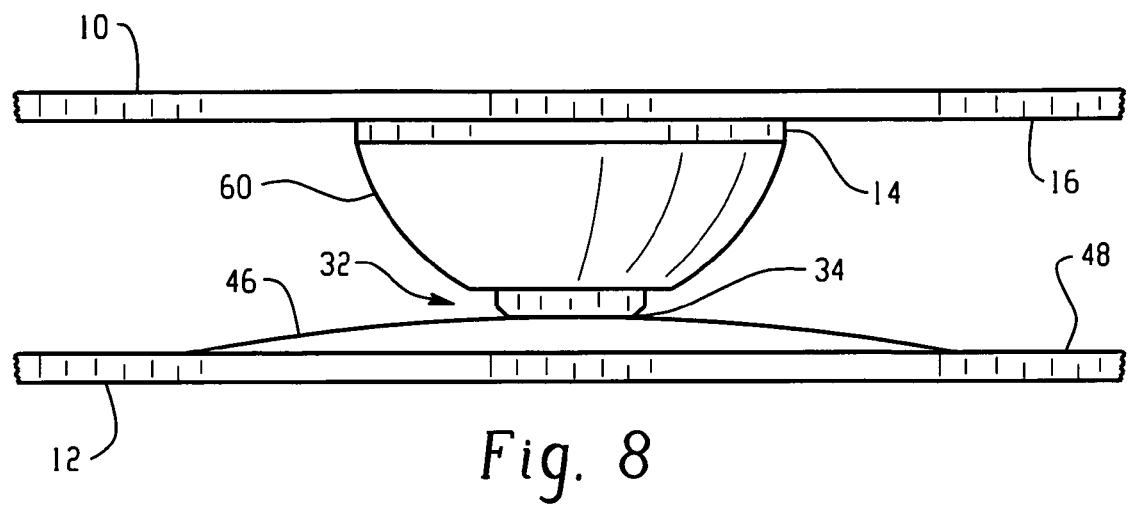
FIGS. 8 and 9 are side and end view illustrations, respectively, of an alternate embodiment of the present invention.
Figure 9:
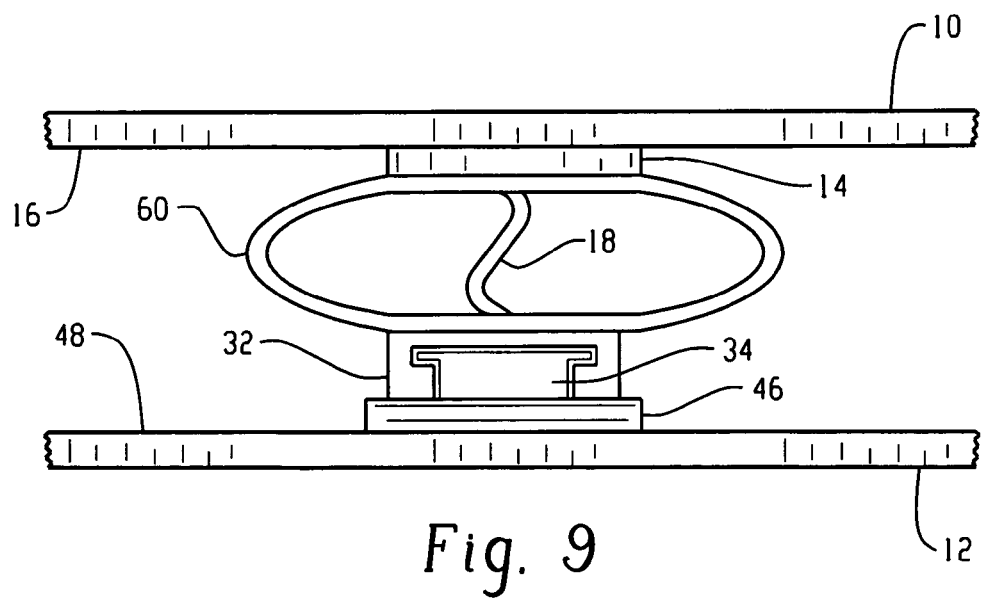

FIGS. 8 and 9 are illustrations of side and end views, respectively, of an alternate embodiment of the present invention. FIGS. 8 and 9 show the alternate embodiment in mated alignment with boards 10 and 12 connected in their parallel configuration. All of the components of the embodiment of FIG. 1 may remain as described except for the springed and pivoted arm assembly which is being replaced in the alternate embodiment by a hollow plastic tubular spring member 60 which may be formed by molding, for example. The spring member 60 is fixedly attached at one end to the base 14 and the female connector 32 is attached at the other end thereof. One end of the cable 18 is attached to the base 14 through one end of the spring member 60 so that it is aligned in cross-section with the array 20 on the board 10 as shown in FIG. 1A and the other end of cable 18 is attached to the connector 32 through the other end of the spring member 60 so that it may be aligned in cross-section with the array 44 at the male connector 34 when the connectors are engaged as shown in FIG. 1B. Also, the connectors 32 and 34 are slidably engagable and disengagable in a similar manner as described for the embodiment of FIG. 1.

The spring member 60 provides support for and controls the extension of female connector 32 in an unmated state. It also provides a spring force for the female connector 32 when engaged with side 48 of board 12 and alignment of connector 32 for slidable engagement with connector 34. Accordingly, when one board is connected in place and the other board is slid in parallel configuration with the one board into its connector, the female connector 32 is forced against the side 48 and ramp 46 by a compression of the spring member 60 and slidably engages male connector 34 with movement of the sliding board. As with the embodiment of FIG. 1, when the sliding board is connected, the connectors 32 and 34 will be fully engaged. Thus, the alternate embodiment of FIGS. 8 and 9 allows either board 10 or 12 to be inserted into its connector with an automatic mechanical slidable engagement of the connectors 32 and 34. Once both boards 10 and 12 are connected in parallel configuration, the cable of optical fibers will be automatically aligned with the arrays 20 and 44 and optical communication between boards may commence.

Either of the foregoing described embodiments may include a low-force plastic detent, which may be formed by molding, to provide coarse alignment in the axis in the direction of slide. Also, the cable fibers and/or arrays may be attached to the slidable male and female connectors using several techniques comprising: (a) potting with an epoxy compound, (b) over-molding the fibers into an array that may be laser trimmed to effect and even mating cross-section surface, (c) looming individual fibers of the cable into an array that may be attached with an epoxy compound to provide retention and an even mating surface, (d) looming individual fibers of the cable into an array that uses "hose barb" features to retain the individual fibers, and may be laser trimmed to provide retention and an even mating surface, and (e) molding, potting, sliding or snapping an entire array assembly of emitters or detectors, including a small printed wiring board (PWB), into either connector, for example.

Figure 10:
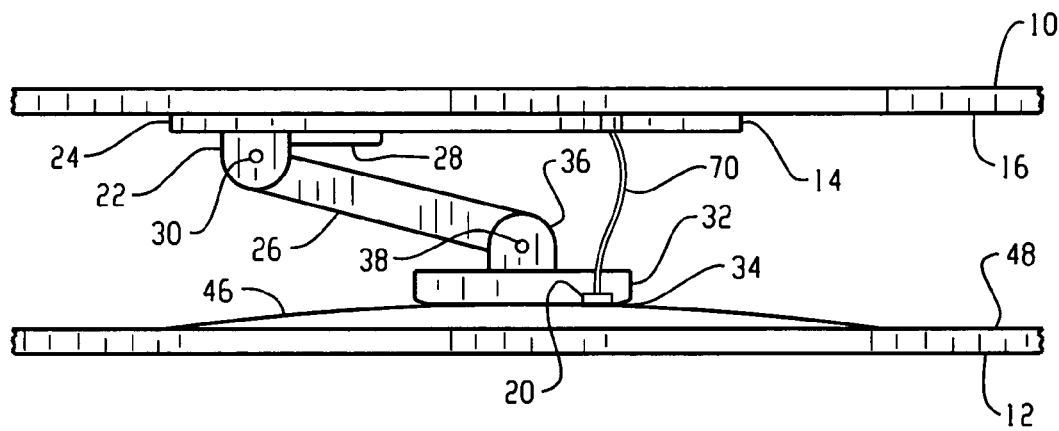
FIG. 10 is a side view illustration of an alternate optical interconnection apparatus suitable for embodying the principles of the present invention.

FIG. 10 is a side view illustration of yet another embodiment of the present invention in which the optical fiber cable 18 is eliminated and the optical array 20 is moved from the PC board 10 as shown in FIG. 1 to the connector 32 so that when the connectors 32 and 34 are mated, the optical arrays 20 and 44 will be in close proximity and aligned with one another. Referring to FIG. 10, the optical array 20 is disposed in the connector 32 and electrically connected to circuitry on PC board 10 through a wiring cable 70 which is held in place at the PC board end by an aperture in the base 14, for example. The cross-sectional sketch of FIG. 10A illustrates an exemplary optical interface between connectors 32 and 34.

Figure 10A:
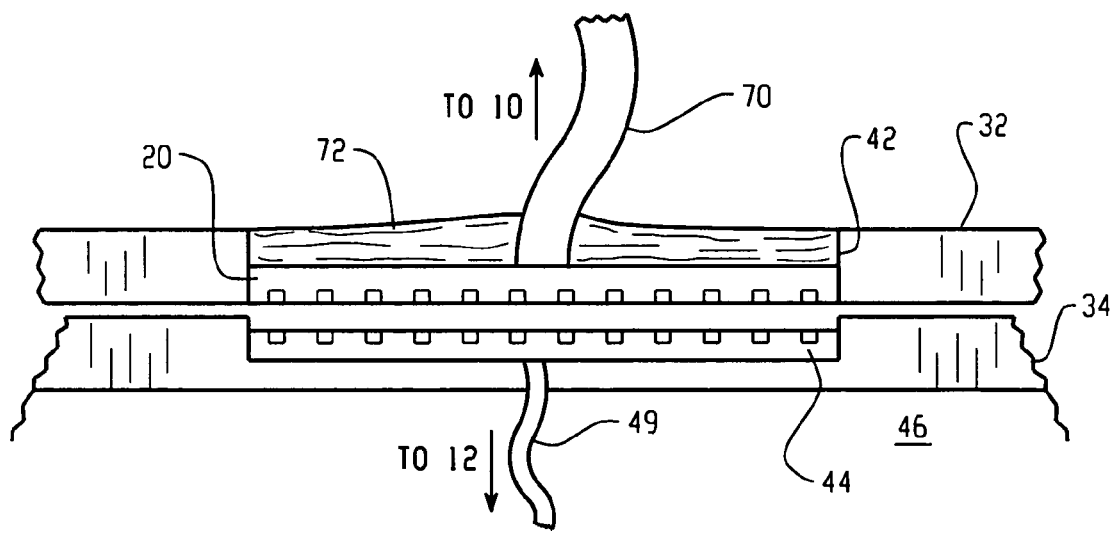
FIG. 10A is a cross-sectional sketch illustrating an exemplary optical interface of optical arrays between two connectors suitable for use in an embodiment of the present invention.

Referring to FIG. 10A, as described herein above, the aperture 42 of connector 32 is positioned to be aligned with the array 44 when the connectors 32 and 34 are mated (see FIG. 1B). In the present embodiment, instead of the optical fiber cable 18, the optical array 20 itself is disposed at the aperture 42 of connector 32 and oriented to face the optical array 44. Accordingly, when the connectors 32 and 34 are mated as shown in FIG. 10A, the arrays 20 and 44 will be aligned with one another. Wiring cables 70 and 49 will connect the elements of their respective optical arrays 20 and 44 to the respective PC boards 10 and 12. The array 20 and wiring cable 70 may be affixed to the connector 32 at the aperture 42 by an adhesive material or potting compound 72, for example.

While this alternate embodiment has been described in connection with the pivoted arm interconnection apparatus of FIG. 1, it is understood that it may be applied just as well to the tubular spring member apparatus of FIGS. 8 and 9 by moving the array 20 to the connector 32 and replacing the optical fiber cable 18 with the wiring cable 70 as shown in FIG. 10A, for example.

While the present invention has been described herein above in connection with a plurality of embodiments, it is understood that this presentation was made entirely by way of example. Accordingly, the present invention should not be limited to any particular embodiment, but rather construed in breadth and broad scope in accordance with the recitation of the claims appended hereto.

What is claimed is:

1. Apparatus for connecting an interconnecting cable between first and second printed circuit (PC) boards, said apparatus comprising:
   a base member disposed on a side of said first PC board for fixedly attaching one end of said interconnecting cable to said first PC board;
   a first connector attached to the other end of said interconnecting cable;
   a second connector disposed on a side of said second PC board; and
   a spring member attached to said base member for supporting said first connector away from the side of said first PC board, said spring member operative to force said first connector against the side of said second PC board to cause slidable engagement of said first and second connectors when one of said first and second PC boards is slid past the other of said first and second PC boards.

2. The apparatus of claim 1 wherein the first connector includes a first slidable interconnect structure and the second connector includes a second slidable interconnect structure; and wherein the first and second connectors are slidably engaged through said first and second slidable interconnect structures thereof.

3. The apparatus of claim 2 wherein the first slidable interconnect structure is a female interconnect structure and the second slidable interconnect structure is a male interconnect structure.

4. The apparatus of claim 1 including a ramp member disposed on the side of the second PC board; wherein the second connector is disposed on top of said ramp member; and wherein the spring member is operative to force the first connector against said ramp member to cause slidable engagement of the first and second connectors when one of the first and second PC boards is slid past the other of the first and second PC boards.

5. The apparatus of claim 4 wherein the ramp member is operative as a guide to accommodate the slidable engagement of the first and second connectors.

6. The apparatus of claim 1 wherein the spring member comprises an arm spring coupled to the base at one end and coupled to the first connector at the other end, said spring coupling at the base forcing said and away from the base.

7. The apparatus of claim 6 wherein the arm is pivotally coupled to the base at the one end to accommodate a spring force rotation of the and away from the base; and wherein the first connector is pivotally coupled to the other end of the arm to accommodate the slidable engagement thereof with the second connector.

8. The apparatus of claim 6 wherein the spring coupled arm and first connector assembly being configured to restrict the movement of the arm away from the base in order to limit tensile force on the cable coupled between the base and first connector.

9. The apparatus of claim 1 wherein the spring member comprises a hollow tubular spring member coupled to the base at one end and coupled to the first connector at the other end.

10. The apparatus of claim 8 wherein the hollow tubular spring member being configured to restrict the extension of the first connector away from the base in order to limit tensile force on the cable coupled between the base and first connector.

11. Apparatus for connecting an optical fiber cable between a first optical array disposed at a first printed circuit (PC) board and a second optical ray disposed at a second PC board for providing optical communication between said first and second optical arrays, said apparatus comprising:
   a base member disposed on a side of said first PC board for fixedly attaching one end of said optical fiber cable in alignment with said first optical array;
   a fiber connector attached to the other end of said optical fiber cable; and
   a spring member attached to said base member for supporting said fiber connector away from the side of said first PC board, said spring member Operative to force said fiber connector to slide against a side of said second PC board and render the other end of said optical fiber cable into alignment with said second optical array of said second PC board when one of said first and second PC boards is slid past the other of said first and second PC boards.

12. The apparatus of claim 11 including a mating connector disposed on the side of the second PC board; and wherein the spring member is operative to force the fiber connector to slide against the side of the second PC board and engage said mating connector to render the other end of the optical fiber cable into alignment with the second optical array when one of the first and second PC boards is slid past the other of the first and second PC boards.

13. The apparatus of claim 12 wherein the fiber connector is slidably engagable with the mating connector.

14. The apparatus of claim 12 including: a ramp member disposed on the side of the second PC board; wherein the mating connector is disposed on top of said ramp member; wherein the spring member is operative to force the fiber connector to slide against said ramp member of the second PC board and engage said mating connector to render the other end of the optical fiber cable into alignment with the second optical array when one of the first and second PC boards is slid past the other of the first and second PC boards; and wherein the ramp member is operative as a guide to accommodate the slidable engagement of the fiber and mating connectors.

15. The apparatus of claim 12 wherein the fiber connector includes an aperture through which the other end of the optical fiber cable may be optically aligned with the second optical array.

16. The apparatus of claim 12 wherein the second optical array is disposed at the mating connector.

17. The apparatus of claim 11 wherein the first optical array is disposed on the first PC board.

18. The apparatus of claim 11 wherein the spring member is configured to restrict the extension of the first connector away from the base in order to limit tensile force on the cable coupled between the base and first connector.

19. Method of connecting an optical fiber cable between a first optical array disposed at a first printed circuit (PC) board and a second optical array disposed at a second PC board for providing optical communication between said first and second optical arrays, said method comprising the steps of:
   fixedly attaching one end of said optical fiber cable in alignment with said first optical array of said first PC board;
   attaching the other end of said optical fiber cable to a fiber connector; and
   sliding one of said first and second PC boards past the other of said first and second PC boards;
   during said sliding, forcing said fiber connector to slide against a side of said second PC board to render the other end of said optical fiber cable into alignment with said second optical array of said second PC board.

20. The method of claim 19 wherein the step of forcing includes slidably engaging the fiber connector with a mating connector disposed on the side of the second PC board to render the other end of the optical fiber cable into alignment with the second optical array.

21. Apparatus fir optically connecting a first optical array electrically coupled to a first printed circuit (PC) board and a second optical array electrically coupled to a second PC board for providing optical communication between said PC boards through said first and second optical arrays, said apparatus comprising:
   a wiring cable coupled at one end to said first PC board;
   a first connector, said first optical ray disposed at said first connector and attached to the other end of said wiring cable; and
   a spring member attached to said first PC board for supporting said first connector away from said first PC board, said spring member operative to force said first connector to slide against a side of said second PC board and render said first optical array into alignment with said second optical array of said second PC board when one of said first and second PC boards is slid past the other of said first and second PC boards.

22. The apparatus of claim 21 including a second connector disposed on the side of the second PC board; wherein the spring member is operative to force the first connector to slide against the side of the second PC board and engage said second connector to render the first optical ray into alignment with the second optical array when one of the first and second PC boards is slid past the other of the first and second PC boards.

23. The apparatus of claim 22 wherein the first connector is slidably engagable with the second connector.

24. The apparatus of claim 22 including a ramp member disposed on the side of the second PC board; wherein the second connector is disposed on top of said ramp member; wherein the spring member is operative to force the first connector to slide against said ramp member of the second PC board and engage said second connector to render the first optical array into alignment with the second optical ray when one of the first and second PC boards is slid past the other of the first and second PC boards.

25. The apparatus of claim 24 wherein the ramp member is operative as a guide to accommodate a slidable engagement of the first and second connectors.

26. The apparatus of claim 22 wherein the second optical array is disposed at the second connector.

27. The apparatus of claim 26 wherein the first connector includes an aperture for containing the first optical array and for optically aligning the first optical array with the second optical array when the first and second connectors are mated.

28. The apparatus of claim 22 wherein the spring member is configured to restrict the extension of the first connector away from the first PC board in order to limit tensile force on the wiring cable coupled between the first PC board and first connector.

29. Method of optically connecting a first optical array electrically coupled to a first printed circuit (PC) board and a second optical array electrically coupled to a second PC board for providing optical communication between said PC boards through said first and second optical arrays, said method comprising the steps of:

attaching one end of a wiring cable to said first PC board;

attaching the other end of said wiring cable to said first optical array;

disposing said first optical array at a first connector;

sliding one of said first and second PC boards past the other of said first and second PC boards; and during said sliding, forcing said first connector to slide against a side of said second PC board to render said first optical array into alignment with said second optical any of said second PC board.

30. The method of claim 29 wherein the step of forcing includes slidably engaging the first connector with a second connector disposed on the side of the second PC board to render the first optical array into alignment with the second optical may.

* * * * *

UNITED STATES PATENT AND TRADEMARK OFFICE
CERTIFICATE OF CORRECTION

PATENT NO.          : 7,229,218 B2
APPLICATION NO.     : 10/945007
DATED               : June 12, 2007
INVENTOR(S)         : Terrel L. Morris et al.

It is certified that error appears in the above-identified patent and that said Letters Patent is hereby corrected as shown below:

In column 6, line 52, in Claim 6, delete "and" and insert -- arm --, therefor.

In column 6, line 55, in Claim 7, after "of the" delete "and" and insert -- arm --, therefor.

In column 7, line 8, in Claim 11, delete "ray" and insert -- array --, therefor.

In column 7, line 18, in Claim 11, delete "Operative" and insert -- operative --, therefor.

In column 8, line 15, in Claim 21, delete "fir" and insert -- for --, therefor.

In column 8, line 22, in Claim 21, delete "ray" and insert -- array --, therefor.

In column 8, line 38, in Claim 22, delete "ray" and insert -- array --, therefor.

In column 8, line 50, in Claim 24, delete "ray" and insert -- array --, therefor.

In column 10, line 4, in Claim 29, delete "any" and insert -- array --, therefor.

In column 10, line 10, in Claim 30, delete "may" and insert -- array --, therefor.

Signed and Sealed this

Sixth Day of October, 2009

David J. Kappos
*Director of the United States Patent and Trademark Office*